Dec. 31, 1929.  E. R. NEWTON  1,741,730
POWER PLANT
Filed Feb. 3, 1923
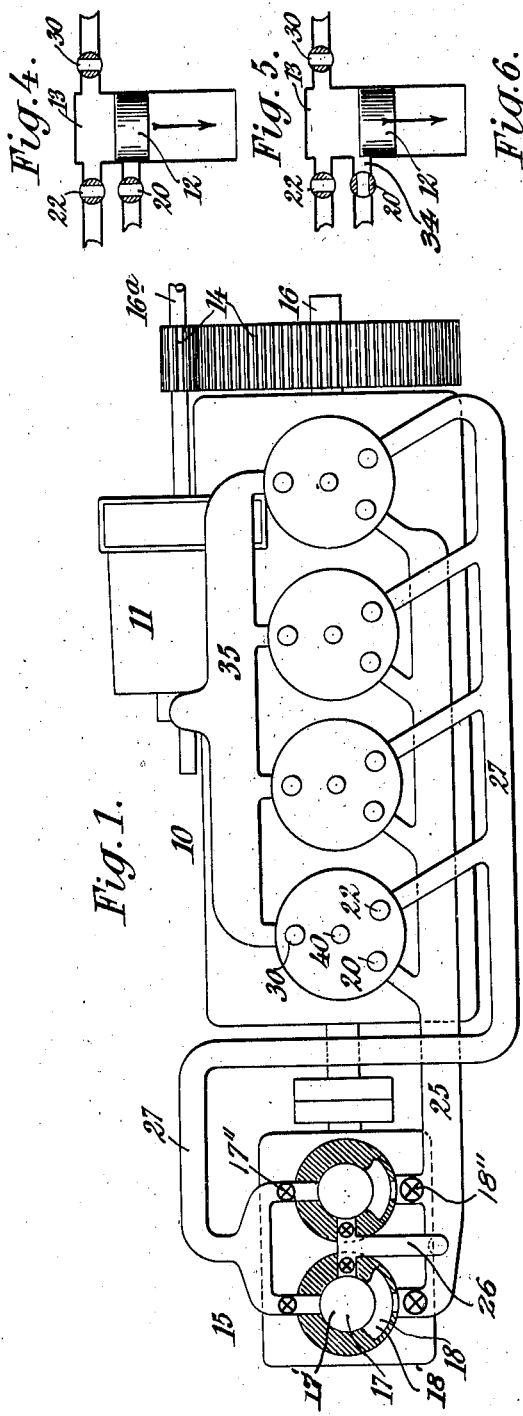
INVENTOR:
Earle R. Newton,
By Attorneys, Patented Dec. 31, 1929

1,741,730

UNITED STATES PATENT OFFICE

EARLE R. NEWTON, OF NEW YORK, N. Y., ASSIGNOR TO CURTIS GAS ENGINE CORPORATION, OF NEW YORK, N. Y., A CORPORATION OF NEW YORK

POWER PLANT

Application filed February 3, 1923. Serial No. 616,859.

This invention relates to power plants of the type set forth in applicant's application for Letters Patent of the United States, Serial No. 359,569, filed February 18, 1920, comprising a four-stroke cycle internal combustion engine charged and scavenged at super-atmospheric pressure by precompressed air, and a turbine driven by the exhaust gas and scavenging air from said engine, and provides a novel combination for effecting the charging and scavenging of said engine.

An embodiment of said invention is illustrated in the accompanying drawings, wherein—

Figure 1 is a diagrammatic plan view of said power plant.

Figs. 2 and 7, inclusive, are diagrammatic views illustrating the engine parts at different parts of a cycle.

Fig. 8 is a diagrammatic view illustrating the operation of the engine on a 4-stroke cycle.

Referring to said drawings, numeral 10 designates the four-stroke cycle reciprocating internal combustion engine, which may be of any suitable type, 11 an elastic fluid turbine of any suitable kind, and 15 a multistage air compressor, which may be of any suitable kind, and which may be driven by the engine or turbine, being here shown as driven by the engine 10. Numeral 12 designates the engine pistons, and 13 the cylinders.

The engine and turbine may be arranged to act upon a single drive shaft, and to this end the engine shaft 16 and turbine shaft 16ª may be geared together.

The compressor 15 comprises a high and a low pressure stage 17 and 18 having pistons 17' and 18' of different area respectively. Air from the atmosphere enters the low-pressure stage 18 and is compressed by the pistons 18' and delivered to the manifold 25 through valves 18''. Part of this air compressed in the pressure stage 18 is taken into the high pressure stage 17 through pipe 26 and compressed by pistons 17' to a higher pressure and delivered through valves 17'' to manifold 27. The engine 10 is provided with charging valves 20 and scavenging valves 22, and the low and high pressure stages 18 and 17 are connected with the valves 20 and 22 respectively by the manifolds 25 and 27.

30 designates an exhaust or transfer valve adapted at suitable times to open and close communication with the manifold 35, which manifold delivers gas which has been partially expanded within the engine, to the turbine 11 for driving the latter. The manifold 25 receiving the low-pressure air preferably communicates with the engine cylinders, as indicated at 34, at a point where the outlet at 34 is covered by the pistons during the greater or a substantial part of the compression and power strokes. The manifold 35 is preferably of such capacity as to serve as a reservoir for the gas received from the engine 10 and delivered to the turbine 11.

Fuel may be introduced into the cylinders through the orifices 40.

The operation of the device will be described with particular reference to Figs 2-7 and 8. On the exhaust stroke or period the valve 30 opens (Fig. 2), allowing combusted gas, which has been expanded in the cylinder to say 11 atmospheres, to escape to the manifold 35 having a mean pressure slightly lower than the cylinder pressure say 10 atmospheres. After the first rush of exhaust gas the remaining gas in the cylinder 13 is expelled through the valve 30 to the manifold 35 by upward movement of the piston 12, at slightly less than 11 atmospheres pressure. Fluid, therefore, is delivered to the manifold 35 during one full stroke or thereabout, as indicated by the arrow 50, Fig. 8. To drive out the residual exhaust gas (having a pressure slightly less than 11 atmospheres) from the cylinder 13 at the end of the exhaust stroke, valve 22 opens (Fig. 3), allowing air at say 11 atmospheres to enter and force out said residual exhaust gas through the valve 30, thereby scavenging said cylinder. This occurs when the piston 12 is at about the top of its stroke and is of short duration (see the arrow 51, Fig. 8). The valve 22 then closes (Fig. 4), the stroke of the piston being aided by the expansion of the scavenging air (11 atmospheres) remaining in the top of the cylinder. Later in the inhalation stroke at about the point where the pressure of the air in the cylinder is reduced to about that of the air in the manifold 27 (see arrow 52), the valve 20 opens (Fig. 5), allowing low-pressure air, at say 3 atmospheres, to charge the cylinder to substantially this pressure (see the arrow 53, Fig. 8). On compression (Fig. 6) this valve closes, and the air at say 3 atmospheres in the cylinder 13, is further compressed by the piston 12 to say 50 atmospheres (see arrow 54). Fuel is injected and combusted and the gas is expanded (see arrow 55, Fig. 8). As the cylinder volume is increased on the power stroke of the engine (Fig. 7), the combusted gas is partially expanded to say 11 atmospheres, and exhaust or transfer to the manifold 35 then takes place by the opening of the valve 30, as described with reference to Fig. 2.

The turbine described herein seems to be the device most likely to be used, at the present time, in combination with the reciprocating internal combustion engine; but it will be obvious that any other suitable device may be substituted for said turbine as the equivalent thereof.

The inventive ideas may receive other embodiments than that herein specifically illustrated and described.

What I claim is:

1. A power plant having in combination a four stroke cycle reciprocating internal combustion engine, and a secondary expansion apparatus, and comprising means for charging the engine cylinders with precompressed air to a pressure substantially above atmospheric pressure; means for transferring the exhaust gas from said engine to said secondary expansion apparatus at an approximately constant pressure substantially above atmospheric pressure, and means for driving out or scavenging with precompressed air at a pressure substantially above that of the charging air the residual exhaust gas from the clearance space of said cylinders into said secondary expansion apparatus whereby the energy in the exhaust gas and in the residual exhaust gas is utilized by expansion in said secondary expansion apparatus.

2. A power plant having in combination a four-stroke cycle reciprocating internal combustion engine, a secondary expansion apparatus and a multi-stage air compressor; means for charging the cylinders of said engine to a pressure substantially above atmospheric pressure with compressed air from one stage of said compressor, means for transferring partially expanded exhaust gas from said engine to said secondary expansion apparatus at an approximately constant pressure substantially above atmospheric pressure, means for driving out with compressed air from a second stage of said compressor the residual exhaust gas from the clearance space of said cylinders, and means for transferring the residual exhaust gas from said engine cylinders to said secondary expansion apparatus, whereby the remaining energy in the exhaust gas and in the residual exhaust gas is utilized by expansion in said secondary expansion apparatus.

3. A power plant according to claim 1, further characterized by said means for supplying compressed air being driven by said engine.

4. A power plant according to claim 1, further characterized by said residual exhaust gas and the main exhaust being lead at substantially the same pressure to the same pressure stage of the secondary expansion apparatus.

In witness whereof, I have hereunto signed my name.

EARLE R. NEWTON.